No. 775,667. PATENTED NOV. 22, 1904.
J. G. ZOLLMAN.
CALCULATING MACHINE.
APPLICATION FILED JAN. 18, 1904.
NO MODEL. 2 SHEETS—SHEET 1.
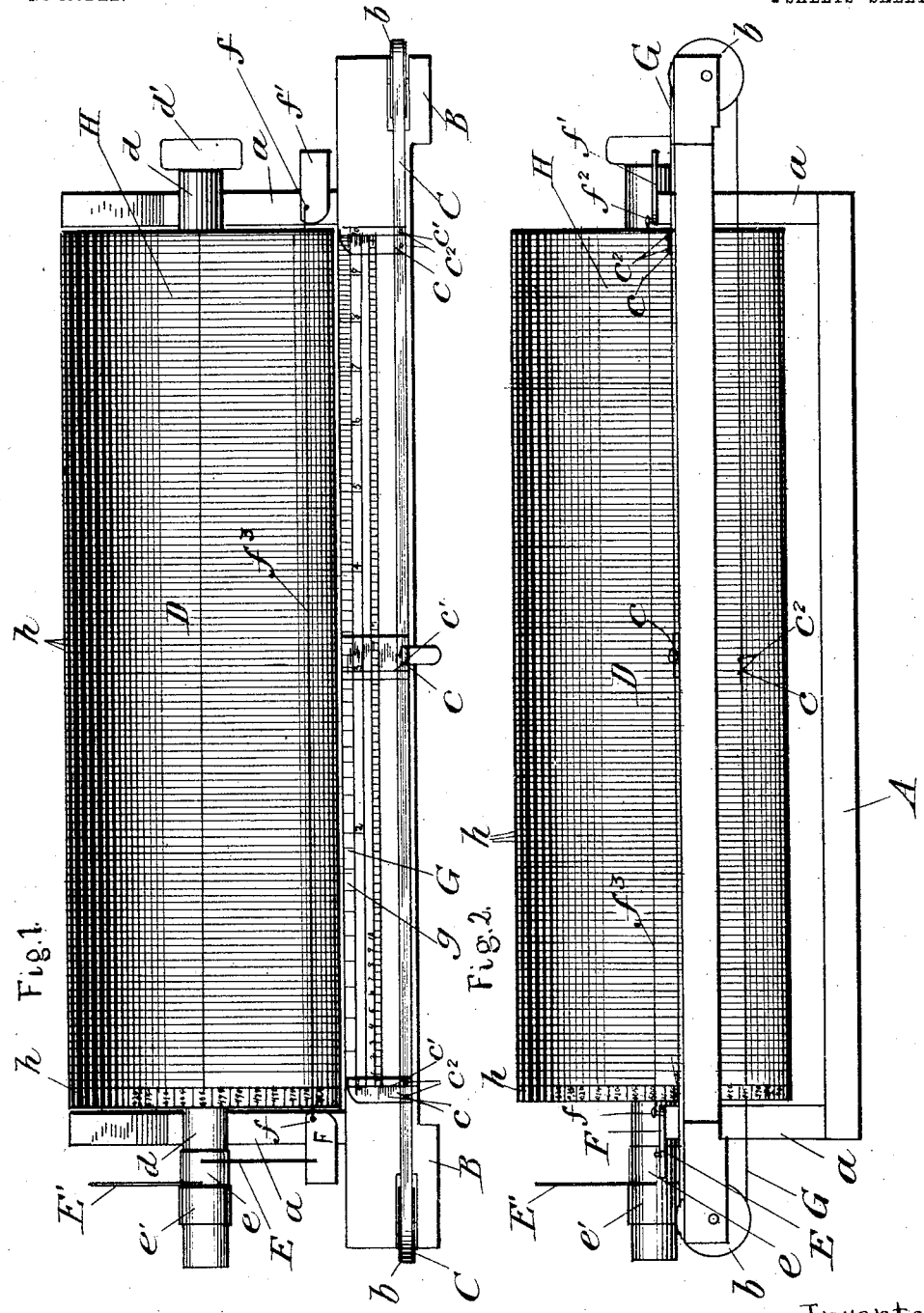
Witnesses
William P. Bond,
Pierson W. Banning.
Inventor.
John G. Zollman
By Banning & Banning
Att'ys.

No. 775,667. PATENTED NOV. 22, 1904.
J. G. ZOLLMAN.
CALCULATING MACHINE.
APPLICATION FILED JAN. 18, 1904.
NO MODEL. 2 SHEETS—SHEET 2.
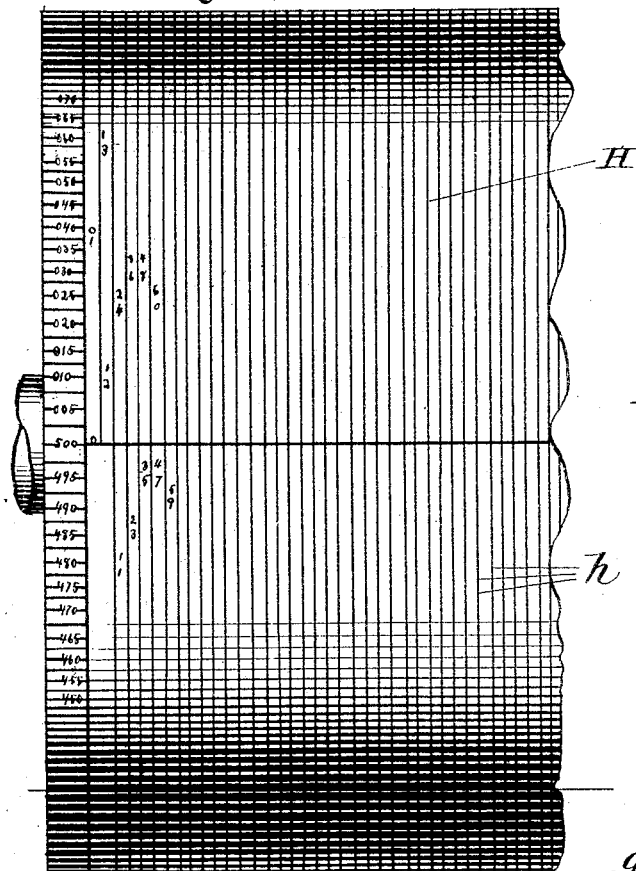
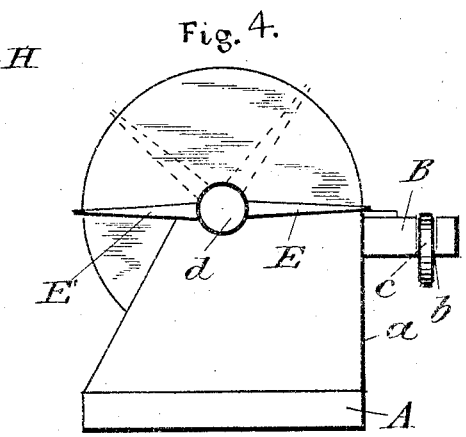
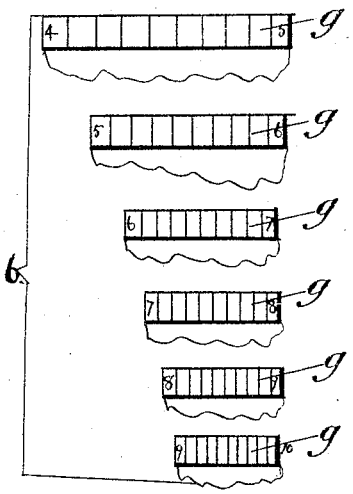
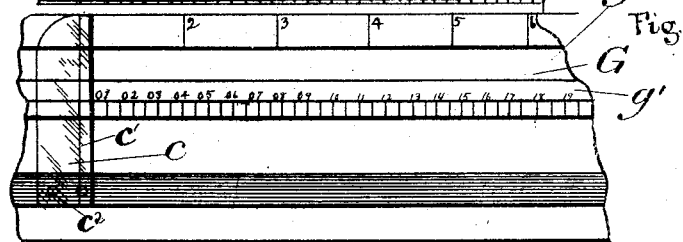
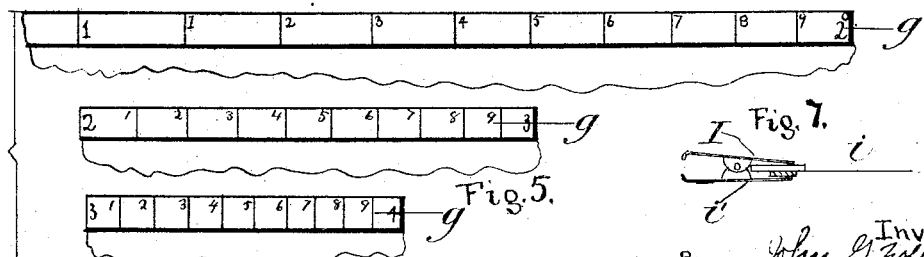
Witnesses
William P. Bond
Pierson W. Banning
Inventor.
John G. Zollman
By Banning & Banning
Attys.

No. 775,667. Patented November 22, 1904.

UNITED STATES PATENT OFFICE.

JOHN G. ZOLLMAN, OF CHICAGO, ILLINOIS.

CALCULATING-MACHINE.

SPECIFICATION forming part of Letters Patent No. 775,667, dated November 22, 1904.

Application filed January 18, 1904. Serial No. 189,629. (No model.)

*To all whom it may concern:*

Be it known that I, JOHN G. ZOLLMAN, a citizen of the United States, residing at Chicago, in the county of Cook and State of Illinois, have invented certain new and useful Improvements in Calculating-Machines, of which the following is a specification.

The object of this invention is to produce a machine by which arithmetical and logarithmic calculations can be made; and the device is so constructed that logarithms can be computed to any desired degree of exactness, depending entirely upon the size of the parts and the degree to which the various scales thereon are subdivided.

One of the objects of the invention is to provide means by which a sufficiency of space will be provided on the scale for a very thorough subdivision and at the same time not unduly complicate the apparatus or confuse the operator. It is apparent that if the attempt be made to subdivide an ordinary linear rule or scale into a great number of subdivisions, and especially into logarithmic subdivisions, that said subdivisions will be so minute or close together after being carried out to a certain degree that the accuracy of the scale will be impaired and the difficulty of its operation increased; and it is to overcome this difficulty and provide means for magnifying, as it were, the subdivisions that the device of the present invention is constructed. It is to be understood, however, that the device is not limited to logarithmic calculations, although the scaling is made by a logarithmic ratio.

In the drawings illustrating the invention, Figure 1 is a top or plan view of the entire device; Fig. 2, a side elevation; Fig. 3, an enlarged fragmentary view of a portion of the scale; Fig. 4, an end view of the entire device; Fig. 5, an enlarged fragmentary view of the linear scale from "1" to "4;" Fig. 6, fragmentary views of the linear scale from "4" to "10," and Fig. 7 an edge view of the movable pointer or index.

The present invention consists of a base or mounting A, provided with upright supporting ends $a$, and near the front edge of the uprights is arranged a longitudinally-extending platform B, supporting at its ends a pair of rollers $b$, around which extends an endless band C, upon which are located three fixed indexes $c$, each index formed, as shown, of a piece of celluloid or other suitable transparent material having thereon a hair-line $c'$, from which the readings are taken, and the indexes are formed from transparent material for the reason that the readings can be more readily taken therefrom than if the same were formed of some opaque substance. The three fixed indexes are equally spaced on the endless belt and are secured at right angles thereto by means of small rivets $c^2$, which pass through the outer edge of the indexes and allow their inner ends to be free and unobstructed, so that the readings can be more readily ascertained. In close proximity to the inner edge of the platform is a large cylinder D, mounted at its ends on trunnions $d$, journaled in the uprights $a$, heretofore described, and on one of the trunnions is a knob or handle $d'$, which enables the entire cylinder to be revolved at will, and on the opposite trunnion are located two pointers E and E', corresponding in function to the indexes hitherto described, and the pointer E is revolubly mounted on the trunnion by means of a collar $e$, which is held within a groove or slot in the periphery of the trunnion, and the pointer E' is removably mounted on the trunnion by means of a collar $e'$, which is of a diameter to overlap or surround the collar $e$ when the pointer E' has been inserted into the trunnion, and said pointers are adapted to contact a stop or abutment F, mounted upon the top of one of the upright supports $a$ by means of an upwardly-projecting pivot-pin $f$, and at the opposite end of the cylinder is a similar block $f'$, which, however, may be fixedly secured, if so desired, and from which upwardly projects a stud or post $f^2$, and between the pivot $f$ and the stud or pin $f^2$ extends a fine index-wire $f^3$, whose function is similar to that performed by the hair-lines on the transparent indexes hitherto described, in that it enables readings to be taken from the peripheral scale which is to be mounted upon the cylinder and which will be hereinafter described.

The platform and cylinder hitherto described serve merely as the mountings or supports for the linear and peripheral or rotary scales, respectively, which coöperate together and which will be described in detail, although it must be apparent that it will be impossible to indicate on the drawings all of the subdivisions into which said scales are divided, since the complexity of division must depend upon the size of the apparatus and the number of spaces or logarithmic degrees which it will be found desirable to read.

The linear and peripheral or rotary scales are divided logarithmically and coöperate with one another according to a uniform ratio.

Upon the platform and in close relation to the inner edge is located a linear scale G, which is initially divided into sections from "1" to "10," and, as will appear from the fragmentary Figs. 5 and 6, the linear extent of such spaces constantly decreases as we approach "10," which decrease is calculated on the logarithmic ratio hitherto mentioned. The initial subdivisions mentioned are indicated upon a space $g$, occupying a position near the center of the linear scale, and immediately outside of said space $g$ is a space $g'$, which is uniformly divided into one hundred divisions marked from "0" to "100," which we will call a "decimal-scale," and it is from said scale that the logarithmic readings are taken after the proper adjustments of the several indexes have been made. Each of the ten divisions of the initial scale is further divided into ten divisions, as indicated in Figs. 5 and 6, and, if desired, still further subdivisions of ten can be made, although it must be apparent that further subdivision will be inexpedient and inaccurate by reason of the minuteness of the resulting divisions, from which it must be apparent that it will be impossible to obtain logarithmic results beyond a very limited degree by the use of the linear scale, and it is to overcome this difficulty and magnify, as it were, the subdivisions that the cylinder is employed. As constructed the cylinder has a circumference equal to exactly one hundred times the length of one of the numbered subdivisions of the decimal-scale $g'$—as, for instance, the space from "1" to "2"—so that the entire circumference of the cylinder will exactly equal the length of the entire decimal-scale from "0" to "100." Upon the cylinder is mounted a circular or peripheral scale H, upon which is drawn a spirally-extending continuous line $h$, which encircles the cylinder two hundred times, so that for each numbered space on the decimal-scale we will have on the cylinder a continuous line extending twice around the cylinder, and said line will be exactly two hundred times as long as the linear space on the decimal-scale with which it coöperates. In other words, two complete revolutions of the cylinder correspond exactly to the movement of one degree on the decimal-scale, so that each linear subdivision has been magnified or enlarged two hundred times, thereby enabling a very much greater and easier subdivision of the spiral line than would be possible of the linear line. The number of such subdivisions of said spiral are indicated, and it will be understood that the amount of space between each of said subdivisions and the numbers indicating the same will be determined according to a logarithmic ratio similar to that heretofore described with reference to the linear scale and the coöperation between the two scales is such that logarithms can be determined to two or three plates or points upon the linear scale and can be carried out or completed to five or six plates or points upon the circular scale, since the spiral scale amounts to nothing more nor less than a minute subdivision of the linear scale. It will of course be understood that in using the scales the operator reads from left to right, as in all similar calculations, and that upon the circular scale the space or subdivisions will be much closer together as we approach the right-hand end of the cylinder corresponding with the arrangement upon the linear scale. At the left-hand end of the cylinder is a band or strip $h'$, divided into one hundred numbered equal subdivisions, and said divisions are numbered by fives from "0" to "500." This band or strip, in connection with the decimal-scale on the platform heretofore mentioned, is employed in certain calculations in which the numerical value of the logarithm of the numbers used is desired, as in calculations involving compound interest and others requiring the powers or roots of numbers, but is not essential to the determination of ordinary problems of multiplication or division.

As has been heretofore explained, the endless band or strip is provided with three fixed markers, and the markers are so fixed upon the band that the distance between the hairlines upon any two of them will be exactly the length of the entire linear scale, and three markers are employed, making the entire length of the endless band exactly three times the length of the linear scale. It is important that these relations should be exact, since the accuracy of the calculations will depend upon the proper positioning of the markers or indexes. Three indexes are employed rather than two, for the reason that when so arranged at least one of the indexes will be constantly in position upon the linear scale. In addition to the three fixed indexes is a movable index I, (shown in Fig. 7,) which index consists of a strip of transparent celluloid having therein a hair-line similar to that hitherto described, and said movable index is carried by a spring-clip $i'$ of ordinary construction, which enables it to be moved back and forth along the movable band or to be removed therefrom, as may be desired.

The device can be used for solving problems in multiplication, division, compound interest, in finding powers and roots of numbers, or in any calculation which may be solved by means of logarithmic tables carried out to five or six places, although it is apparent that the present device can, if properly and accurately constructed and with a cylinder of enlarged size, be enabled to carry out logarithms to any desired degree, depending entirely upon the minuteness of subdivision of spaces and accuracy of adjustment of the various parts.

In the operation of the device in multiplying not only will the ultimate product be given arithmetically, but logarithms of the two numbers will be incidentally given during the operation, so that, if desired, they may be retained. It will be understood that although the scales are subdivided by a logarithmic ratio the readings obtained therefrom are in ordinary cases the ultimate arithmetical readings, and the logarithmic readings, which are made on the decimal-scale, are but incidental to the ordinary operation of the machine, although, of course, at times it may be desirable to obtain the logarithms themselves.

The operation in an ordinary case of multiplication is as follows: We will assume, for example, that it is necessary to multiply together the numbers "423" and "526." The endless band will first be moved so as to bring one of the series of three fixed indexes somewhere between "42" and "43" on the initial scale. Since the space between "42" and "43" is not divided up, it will be impossible to exactly set the index; but said index will be set as nearly as practicable, and it will then be found that the hair-line will point toward one of the revolutions of the spiral line on the cylinder. The cylinder will then be turned until the numeral "30" on said spiral line appears opposite the index-wire, at which point the hair-line on the fixed index should point exactly toward the spiral line. The logarithm of the number "423" can then be read from the decimal-scale and the numbered band on the cylinder, which latter is but a corresponding enlargement on the cylinder of the decimal-scale on the platform divided into spaces from ".000" to ".500," so that two revolutions will give the readings from ".000" to "1.000," or, in other words, said band divides the space between "0" and ".01" on the decimal-scale into thousandths. On the decimal-scale we find the reading as taken by the fixed index to be between ".62" and ".63," but nearer ".63," which, of course, is a logarithm not sufficiently carried out to be of value, and it is to determine the remaining figures that we consult the band on the cylinder, which in this instance, as read by the index-wire, stands at about ".135." Since the linear reading stands between ".62" and ".63," but nearer ".63," we must add "500," or the number corresponding to one revolution of the cylinder, to the number indicated on the band, giving the ultimate reading as taken from the band "500" plus "135" or "635" plus, which added to the reading "62" on the decimal-scale gives the total logarithm ".62635" plus. This is the mantissa, and the characteristic "2" is added, as in ordinary cases.

In order to continue the multiplication, the relatively fixed arm E will then be moved to contact the abutment or block heretofore mentioned, and when said contact is made the arm E, which we will call the "fixed" arm, corresponds in position to the fixed index. The movable index will then be positioned on the endless band, so that its hair-line points to "0" on the linear scale, after which the cylinder will be turned (without displacing the position of the fixed arm) until the position of "0" on the circular or spiral scale is indicated by the wire, at which point the movable arm, corresponding in function to the movable index, will be inserted into place, with its collar surrounding the collar of the fixed arm, and we will then have a distance between the fixed and movable arms which controls the circular scale, which distance corresponds in degree to the distance between the fixed and movable index on the linear scale. The band is then moved forward until the movable index stands between "52" and "53," but nearer "53," and the cylinder is then moved, with the movable arm fixed against the abutment to maintain its position and the position of the fixed arm, which is clamped by the movable arm, until the number "6" on the spiral line appears opposite the index-wire. The logarithm of the number "526" will then be found to be ".72102" plus with the characteristic "2." We may then, of course, add the logarithms and obtain the logarithm indicating the product, if we so desire. The sum of the logarithms will be ".34737" plus with the characteristic "5," and the number corresponding to said logarithm will be found to be "222,498." The product, however, can be immediately read from the fixed index on the linear and circular scale without recourse to the logarithmic readings, as follows: The hair-line on the fixed index will be found to stand between "22" and "23," and in order to determine the exact number we turn back the cylinder until the fixed arm strikes the abutment, when the number "25" will be read from the index-wire on the spiral line opposite the hair-line on the fixed index, which added to "22" gives about "222,498," which is the final product as derived from the machine of this invention. This number will be found to be correct; but it is plain that in some instances there may be a slight deviation, owing to the fact that it is impossible with any logarithmic scale or table to determine results with absolute accuracy; but for all practical purposes the machine of the present invention will solve problems of multiplication, division, compounding of interest, and the roots and powers of numbers with the same degree of accuracy that can be obtained by the use of logarithmic tables commonly in use.

The above explanation as to the method of operating the device will enable any one familiar with the use of logarithms to perform problems of division, &c., which are performed in substantially the same way as that heretofore described.

It will be apparent that the size of the cylinder can be greatly increased, so that it will be possible to divide the spiral or circular scale into many more divisions, and the accuracy of the results obtained and the degree to which the logarithmic readings can be made will depend upon the minuteness of subdivision and the correctness of adjustment of the scales.

What I regard as new, and desire to secure by Letters Patent, is—

1. In a calculating-machine, the combination of a linear scale having a plurality of divisions, a cylinder having its periphery parallel with the linear scale and in close proximity thereto, said cylinder having a circumference of predetermined ratio to the linear scale and an indicating-line for each of the divisions of the linear scale extending around the cylinder, said line being divided into subdivisions having a predetermined ratio to the subdivisions on the linear scale and serving to subdivide the linear divisions, substantially as described.

2. In a calculating-machine, the combination of a linear scale, having thereon a plurality of subdivisions, and a cylinder revolubly mounted in proximity to the linear scale and having on its periphery a spirally-extending line divided into subdivisions having a predetermined ratio to the divisions of the linear scale and serving to further subdivide the linear subdivisions, substantially as described.

3. In a calculating-machine, the combination of a linear scale having thereon a plurality of subdivisions marked according to the logarithmic ratio, a decimal-scale in proximity to the logarithmic scale, a cylinder having thereon a spirally-extending line divided logarithmically into subdivisions having a predetermined ratio to the logarithmic divisions of the linear scale, and a decimally-divided circular scale on the cylinder having subdivisions with a predetermined ratio to the divisions on the decimal-scale, substantially as described.

4. In a calculating-machine, the combination of a linear scale having thereon a plurality of subdivisions marked according to the logarithmic ratio, a decimal-scale in proximity to the logarithmic scale, a cylinder having thereon a spirally-extending line divided logarithmically into subdivisions having a predetermined ratio to the logarithmic divisions of the linear scale, a decimally-divided circular scale on the cylinder having subdivisions with a predetermined ratio to the divisions on the decimal-scale, movably-mounted indexes for the linear and spiral scales, and a wire extending across the revolutions of the spiral line for taking readings therefrom, substantially as described.

5. In a calculating-machine, the combination of a linear scale having thereon a plurality of subdivisions marked according to the logarithmic ratio, a decimal-scale in proximity to the logarithmic scale, a cylinder having thereon a spirally-extending line divided logarithmically into subdivisions having a predetermined ratio to the logarithmic divisions of the linear scale, a decimally-divided circular scale on the cylinder having subdivisions with a predetermined ratio to the divisions on the decimal-scale, a movable endless band having thereon a fixedly-attached index and a movable index, said indexes coöperating with the linear and decimal scales, and indexes for the spiral scale, substantially as described.

6. In a calculating-machine, the combination of a linear scale logarithmically divided, a decimal-scale in proximity to the logarithmic scale, a movable band in proximity to the linear and decimal scales, an index fixedly attached to the band, and an index movable on the band, substantially as described.

7. In a calculating-machine, the combination of a linear scale logarithmically divided, a decimal-scale in proximity to the logarithmic scale, a movable endless band, mounted to have an endwise travel, in proximity to the linear and decimal scales, an index fixedly attached to the band, and an index movable on the band, substantially as described.

8. In a calculating-machine, the combination of a linear scale having divisions numbered from 1 to 10 and logarithmically spaced, a decimal-scale of the same length uniformly divided into spaces numbered from .00 to 1.00, a spirally-extending line mounted on a cylinder having a circumferential length of predetermined ratio to the divisions of the decimal-scale, said line being divided logarithmically to have its divisions bear a predetermined ratio to the logarithmic divisions of the linear scale, and indexes for the linear and spiral scales for enabling said scales to act in combination with one another, substantially as described.

JOHN G. ZOLLMAN.

Witnesses:
SAMUEL W. BANNING,
WALKER BANNING.